United States Patent
Scholl

(10) Patent No.: US 9,385,925 B1
(45) Date of Patent: Jul. 5, 2016

(54) ANYCAST ROUTE DETECTION

(71) Applicant: Amazon Technologies, Inc., Reno, NV (US)

(72) Inventor: Thomas Bradley Scholl, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 291 days.

(21) Appl. No.: 14/108,123

(22) Filed: Dec. 16, 2013

(51) Int. Cl.
*H04L 12/24* (2006.01)
*H04L 29/08* (2006.01)

(52) U.S. Cl.
CPC ............... *H04L 41/50* (2013.01); *H04L 67/18* (2013.01)

(58) Field of Classification Search
None
See application file for complete search history.

(56) References Cited

U.S. PATENT DOCUMENTS

| | | | | |
|---|---|---|---|---|
| 9,025,694 B1 * | 5/2015 | Alkhaled | ................ | H04L 25/10 375/285 |
| 2004/0107234 A1 * | 6/2004 | Rajahalme | ............... | H04L 12/18 709/200 |
| 2004/0120266 A1 * | 6/2004 | Ko | ........................ | H04L 45/742 370/252 |
| 2005/0174989 A1 * | 8/2005 | Chen | ........................ | H04L 45/00 370/351 |
| 2008/0175240 A1 * | 7/2008 | Suzuki | ..................... | H04L 12/18 370/390 |
| 2010/0098072 A1 * | 4/2010 | Satterlee | .................. | H04L 45/04 370/389 |
| 2013/0223226 A1 * | 8/2013 | Narayanan | ............. | H04L 45/308 370/236 |
| 2014/0007187 A1 * | 1/2014 | Harrison | .................. | H04L 63/10 726/1 |
| 2014/0201394 A1 * | 7/2014 | Wagstaff | ................ | G06F 9/4411 710/8 |

* cited by examiner

*Primary Examiner* — Thomas Dailey
(74) *Attorney, Agent, or Firm* — Knobbe, Martens, Olson & Bear, LLP

(57) ABSTRACT

Systems and methods are described to detect routes utilized by client computing devices to access anycast points of presence. Multiple anycast points of presence may be associated with an anycast destination address. A client computing device may therefore connect to any of the multiple anycast points of presence, selected based on routing protocols. In some instances, client computing devices may connect to an undesirable point of presence. In order to detect an diagnose undesirable anycast connections, individual point of presence are configured to transmit anycast probes to client computing devices and/or nodes connecting the point of presence and a client computing device. Responses to each probe may be transmitted to the anycast destination address, which may be routed to an originating point of presence or to an alternative point of presence. Resulting data may be used to automatically generate warnings indicating undesirable anycast connections.

23 Claims, 5 Drawing Sheets

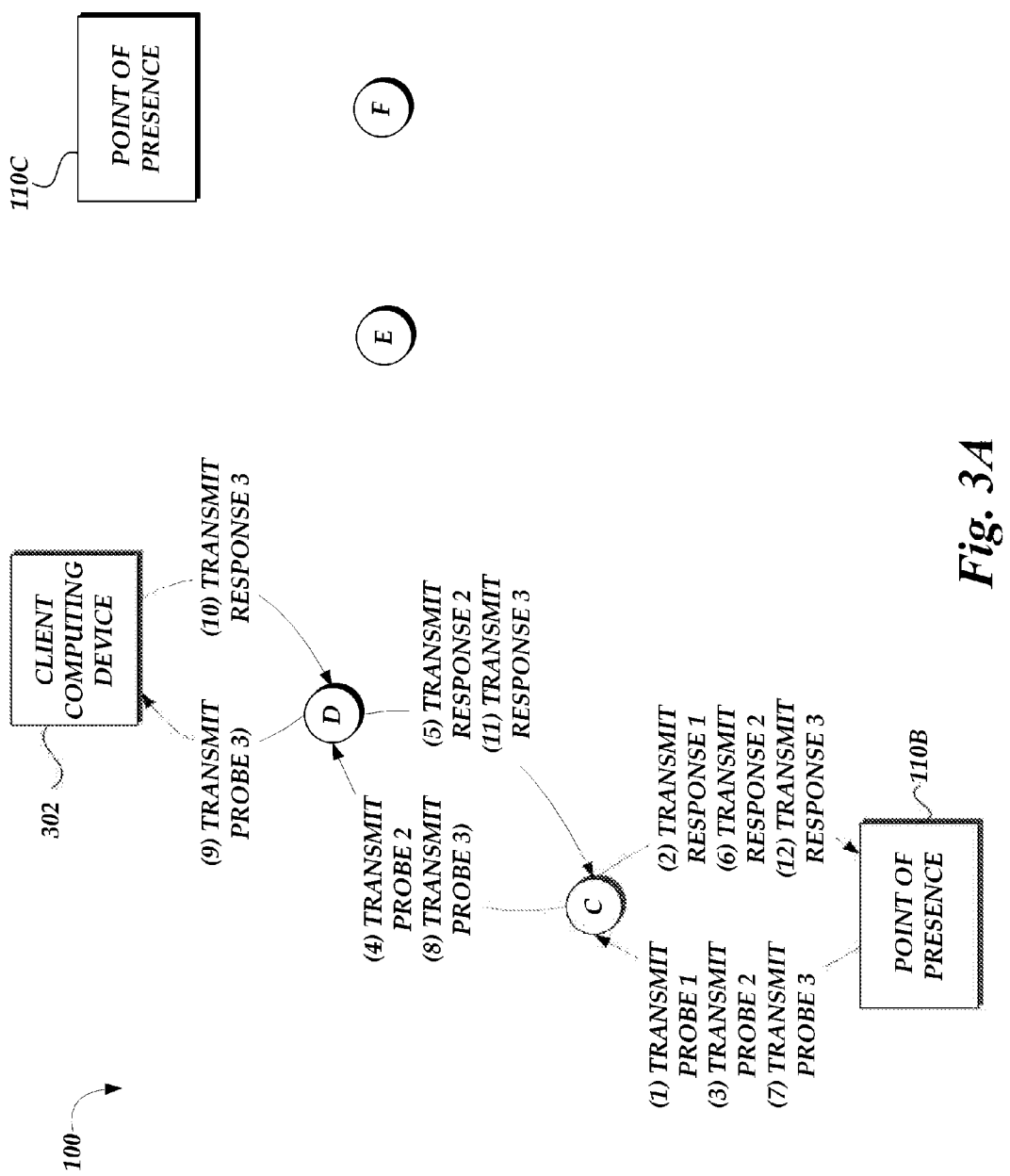

ANYCAST ROUTE DETECTION

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

Anycast addressing and routing methodology enables multiple data centers to provide similar or identical content to client computing devices. Specifically, anycast enables multiple data centers (or computing devices within the data center) to establish affiliation with a network-accessible address, such as an internet protocol (IP) address. When a client computing device requests a resource at the network-accessible address, the client computing device may be routed to any of the multiple data centers, based on networking decisions made by intermediate devices (e.g., network routers). Generally, client computing devices may be routed to a topologically-nearest data center. Where data centers are physically or logically dispersed (e.g., across a geographic area), client computing devices may therefore automatically connect to a nearest data center, without requiring selection of a specific data center (or client knowledge that multiple data centers exist).

BRIEF DESCRIPTION OF THE DRAWINGS

FIG. 3A is a block diagram illustrating transmission of anycast probes from a point of presence, and transmission of probe responses to the point of presence;

DETAILED DESCRIPTION

Figure 1:
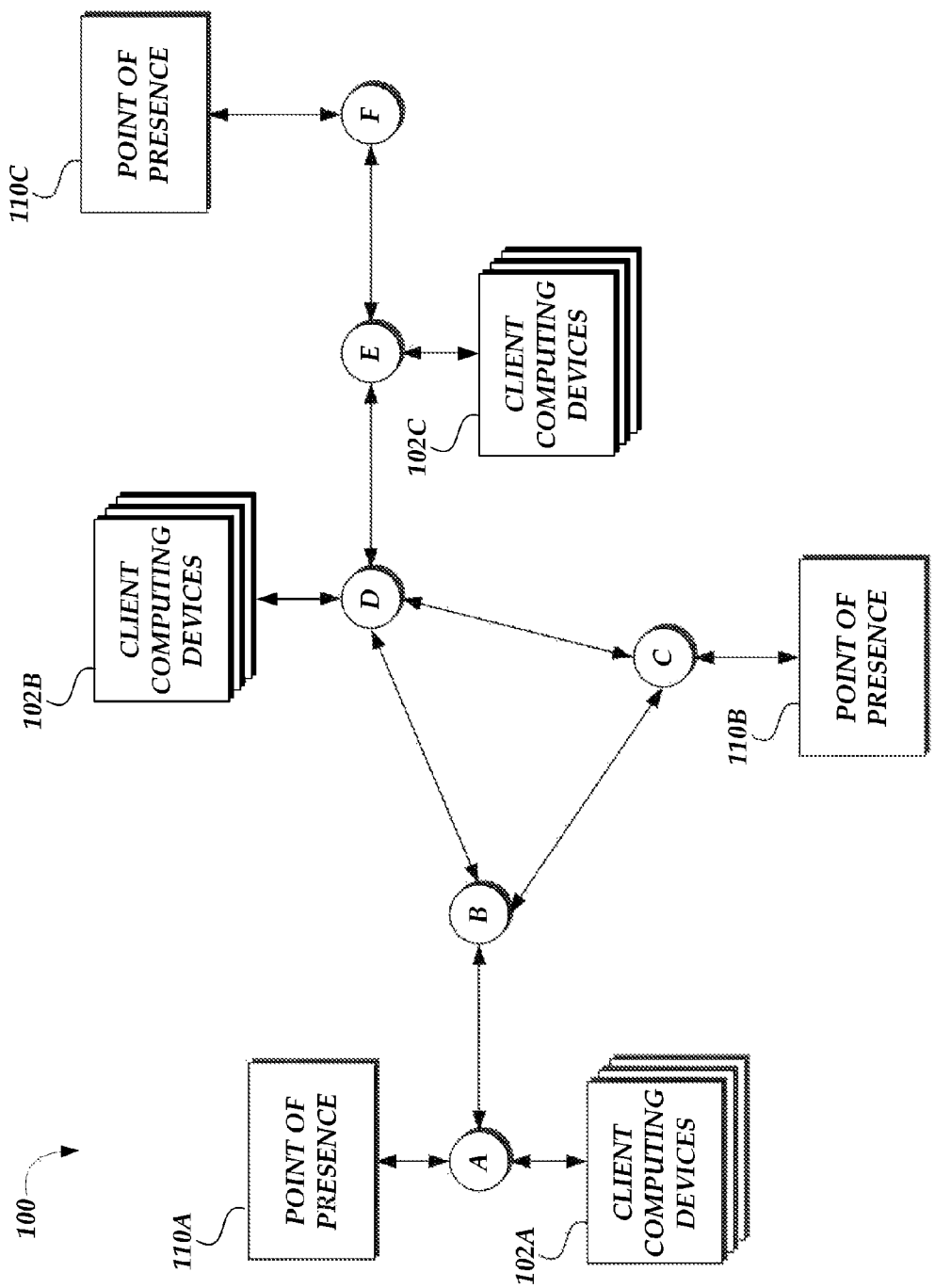
FIG. 1 is a block diagram depicting an illustrative network topology including multiple points of presence and multiple client computing devices interconnected via a set of network nodes.

Generally described, aspects of the present disclosure relate to analyzing and detecting undesirable routing to points of presence within a network utilizing anycast. Points of presence may generally refer to any computing device accessible to client computing devices on a network, such as computing devices providing services to client computing devices. For example, a point of presence may include a domain name system (DNS) service or a content delivery network (CDN) service. Multiple points of presence providing the same service or interchangeable services may utilize anycast methodologies to enable client computing devices to automatically connect to an accessible point of presence. Specifically, anycast enables multiple points of presence to become associated with a shared network address. When a client computing device transmits a request for content to the shared network address, intermediate network nodes (e.g., routers) select an appropriate point of presence to service the request. Selection of an appropriate point of presence may occur via a number of networking protocols, such as border gateway protocol (BGP). Generally, it may be desirable for a specific set of computing devices to connect to a given point of presence (e.g., due to geographical proximity). However, because routing of requests may occur over third-party networks, anycast-based requests of client computing devices may in some instances be routed to an undesirable point of presence. In accordance with aspects of the present disclosure, points of presence may utilize anycast probes in order to determine the routing of anycast-based requests by client computing devices, as well as by intermediate network nodes.

Specifically, a point of presence may be configured to transmit anycast probes to a set of target client computing devices, and to utilize the results of such probes to determine an expected routing of anycast requests originating from the target client computing devices. In one embodiment, anycast probes may correspond to an Internet Control Message Protocol (ICMP) echo request packet. The point of presence may create an anycast probe including a unique identifier of the point of presence. Thereafter, the point of presence transmits the probe to a target computing device. The target computing device may, in turn, transmit an ICMP echo reply packet, including the unique identifier. Because the echo reply packet is addressed to the anycast address of the originating point of presence, it may be transmitted to any point of presence associated with the anycast address. Accordingly, if the echo reply is received at the originating point of presence, requests from the client computing device for the anycast address can be determined to be routed to the originating point of presence. If the echo request is received at an alternative point of presence, requests from the client computing device for the anycast address can be determined to be routed to the alternative point of presence. In one embodiment, routing detected via anycast probes can be compared to a desired routing to detect undesirable anycast routing.

In one embodiment, detailed information regarding anycast routing may be gathered by transmitting multiple echo requests with incrementing time-to-live (TTL) values. Intermediate nodes (e.g., routers) between a point of presence and a client computing device may generally be configured to decrement TTL values of echo requests on routing, and to transmit an ICMP time exceeded message in response to an echo request with a zero TTL value. Accordingly, an echo request with a TTL value of one is expected to result in time exceeded message being transmitted by the first intermediate node. As described above, because the time exceeded message is targeted towards an anycast address, the message may be routed to either an originating point of presence or other alternative points of presence. A receiving point of presence may inspect the time exceeded message to identify the intermediate node as well as an originating point of presence. By incrementing the TTL value of an echo request, a point of presence may determine anycast routing for each intermediate node between the point of presence and a client computing device. Echo requests with incrementing TTL values may be generated, for example, based on a modified traceroute routine, standard versions of which are well known within the art.

Transmission of echo requests from points of presence associated with an anycast address may therefore be utilized to determine the routing of anycast-based requests by client computing devices and/or network nodes. Further, because transmission of echo requests may be initiated by points of presence, anycast routing may be actively inspected. Such active inspection may provide advantages over alternative, passive inspection techniques, such as inspection of point of presence request logs. Specifically, active inspection may allow points of presence to specifically target computing devices for inspection, and further allow points of presence to control the volume and frequency of anycast routing inspection information.

In one embodiment, targets for transmission of anycast probes may be selected based on a desired geographical service area of a point of presence. For example, an administrator or manager of a point of presence may desire all or most users within a specific geographical area (e.g., within X miles of the point of presence or within the same state, country, or continent as the point of presence) to be routed via an anycast address to the point of presence. Accordingly, the point of presence may transmit anycast probes (e.g., echo requests generated in accordance with the present disclosure) to computing devices (e.g., client computing devices or networking devices) within the specific geographical area. In one embodiment, devices within a specific geographical area may be targeted based on IP-to-geographic location mappings (commonly referred to as "IP geolocation"). Techniques for mapping IP addresses to geographic locations are well known within the art, and therefore will not be discussed in detail herein. A point of presence may utilize IP geolocation to determine a set of IP addresses within the desired geographic zone, and thereafter transmit anycast probes to these addresses. The point of presence may further store data received in response to these probes for manual analysis by an operator or administrator of the point of presence. As will be described below, in some embodiments, a point of presence may automatically or programmatically analyze responses to anycast probes to detect undesirable anycast routings.

In another embodiment, targets for transmission of anycast probes may be determined based on client data stored by the point of presence. For example, where a point of presence is associated with a CDN, client computing devices may provide client data to the point of presence or CDN. Client data may include, for example, a geographic or mailing address of the client computing device. The point of presence may further maintain information regarding network addresses associated with the client computing device (e.g., based on access of the CDN by the client computing device). Accordingly, the point of presence may associate a client computing device's network address with the geographic or mailing address of the client computing device. Thereafter, a point of presence may select to transmit anycast probes to client computing devices based on addresses associated with those devices. For example, a point of presence may transmit anycast probes to all client computing devices associated with geographic or mailing addresses within a specific city, state, country, etc.

In some embodiments, results of replies to anycast probes may be automatically analyzed by a point of presence in order to detect undesirable anycast routing. Illustratively, where a point of presence desires to serve client computing devices within a specific geographical area, a point of presence may inspect results of anycast probes (e.g., echo responses or time exceeded messages) to determine a percentage of client computing devices within the geographical area that are communicating with the point of presence via an anycast address. In one embodiment, a threshold for response to anycast probes may be specified, such that if less than a threshold number of responses are received at the intended point of presence, a warning is transmitted to an operator of the point of presence. Such a threshold number may be selected, for example, based on an acceptable tolerance level for undesirable anycast routing and/or on an expected response rate of client computing devices (e.g., due to client computing devices being configured not to respond to echo requests). As will be discussed in more detail below, a warning message may further include routing details for anycast requests, such that an operator may determine a specific network node at which anycast requests diverge to an alternative point of presence.

In another embodiment, undesirable anycast routing may be detected based at least in part on anycast probe responses being received at an alternative point of presence. For example, a first point of presence may transmit anycast probes only to client computing devices within its desired set of client computing devices. If undesirable anycast routing exists, a portion of such client computing devices may transmit responses to the probes to an alternative point of presence. Accordingly, the alternative point of presence may detect the presence of responses from undesired client computing devices, and generate a warning message to an operator indicative of the responses. In some embodiments, the point of presence may only transmit such a warning message when the amount of responses from undesired client computing devices exceeds a given level (e.g., an absolute level or a percentage level of responses received at the alternative point of presence).

In another embodiment, undesirable anycast routing may be detected based at least in part network topology criteria, such as hop count. Hop count may generally refer to the number of networking devices (e.g., routers) through which data travels when in route to its destination. Illustratively, a point of presence may desire to provide services (e.g., DNS or CDN services) to any device within a threshold hop count value. Accordingly, the point of presence may inspect anycast probe responses in order to determine routing of anycast requests from devices (e.g., client computing devices and/or networking devices) within the threshold hop count value of the point of presence. For example, where anycast probes are transmitted with increasing TTL values, a point of presence may receive response messages (e.g., time exceeded messages) from a device at each successive "hop" (e.g., each successive TTL value). The maximum TTL value at which an originating point of presence receives a response can therefore represent the maximum number of "hops" served by the point of presence. Illustratively, if this value is below a desired threshold level, the point of presence may generate a warning to an operator of the point of presence.

The foregoing aspects and many of the attendant advantages will become more readily appreciated as the same become better understood by reference to the following description of one illustrative embodiment, when taken in conjunction with the accompanying drawings depicting the illustrative embodiment.

FIG. 1 is a block diagram depicting an illustrative network topology 100 including multiple points of presence 110, configured to share an anycast network address, as well as multiple sets of client computing devices 102 that may communicate with the points of presence 110 via the anycast address. In one embodiment, a point of presence 110 may include a single computing device (e.g., a DNS server). In another embodiment, a point of presence 110 may include multiple computing devices in communication with one another, collectively providing a service to client computing devices 102.

Components and attributes of points of presence 110 are further described below with respect to FIG. 2.

Client computing devices 102 may generally include any computing device receiving the services provided by the points of presence 110. While the term "client" is used in reference to client computing devices 102, client computing devices 102 should not be construed as limited to end user computing devices. Rather, client computing devices 102 may include end user devices, devices owned or operated by other service providers, or devices owned or operated by an administrator of the points of presence. Examples of client computing devices 102 include, but are not limited to, laptop computers, tablet computers, personal computers, servers, personal digital assistants (PDAs), hybrid PDA/mobile phones, mobile phones, electronic book readers, set-top boxes, cameras, digital media players, and the like.

The client computing devices 102 and the points of presence 110 are interconnected via a communication network comprised of nodes A through F. Each node A through F may generally correspond to a networking device configured to facilitate communications between the client computing devices 102 and the points of presence 110. For example, nodes A through F may correspond to routers, gateways, switches or computing devices configured to act as routers, gateways or switches. While a limited number of nodes are depicted within FIG. 1 for simplicity, the client computing devices 102 and points of presence 110 may be interconnect via any number of networking devices. In one embodiment, client computing devices 102 and points of presence 110 may communicate at least in part via a wide area network (WAN) or global area network (GAN).

Each of the points of presence 110 may be associated with a shared anycast network address, such as an IP address. In accordance with routing protocols utilized by the points of presence 110 and the nodes A through F, each point of presence 110 may advertise an association with the anycast address to nodes A through F. Accordingly, when a node A through F receives a request (e.g., from a client computing device 102) to access the anycast network address, the respective node may select a point of presence 110 to which to route the request based on a routing protocol. Accordingly, client computing devices 102 may interact with an individual point of presence 110 selected by intermediate nodes, by requesting resources from the shared anycast network address.

In addition, an operator of the points of presence 110 may desire to service particular sets of client computing devices 102. Illustratively, it may be desirable for point of presence 110A to provide services to client computing devices 102A, for point of presence 110B to provide services to client computing devices 102B, and for point of presence 110C to provide services to client computing device 102C. However, because the routing of anycast requests is determined by intermediate nodes A through F (which may not be affiliated with or under control of the points of presence 110), it may not be possible to ensure that desirable routing occurs in all instances. Illustratively, client computing devices 102B are separated from point of presence 110B by only two intermediate nodes, and from points of presence 110A and 110C by three nodes. Accordingly, it may be assumed that requests by client computing devices 102B directed to the anycast address of the points of presence 110 may be routed to point of presence 110B. However, in some instances node D may prefer to route anycast requests from client computing devices 102B to an alternate node (e.g., node B or E). Further, the alternative node, based on its own routing policies, may determine that the anycast request should be routed to an alternative point of presence 110 (e.g., point of presence 110A or 110C). Accordingly, the routing policies of nodes A through F may result in undesirable routing of anycast requests.

Accordingly, each point of presence 110 may be provisioned with an anycast inspection manager configured to transmit anycast probes to client computing devices 102 or interconnecting nodes, and to track or analyze the results of such probes. For example, point of presence 110B may be configured to transmit an anycast probe to all nodes separating the point of presence 110B from client computing devices 102B. Accordingly, the point of presence 110B may generate a first anycast probe identifying the point of presence 110B as an originating device, and transmit the probe to node C. Node C, in response, may transmit a reply addressed to the anycast address of the point of presence 110. Because the reply is addressed to the anycast address shared among the points of presence 110, the node C may determine which point of presence 110 (or which network node) the reply should be directed to. In the instance that the reply is returned to point of presence 110B, node C may be assumed to route anycast requests to the point of presence 110B. Similarly, the point of presence 110B may generate a second anycast probe, and transmit the probe to node D. Node D, in response, may transmit a reply addressed to the anycast address of the point of presence 110. Rather than routing the reply back to node C, and therefore on to point of presence 110B, node D may route the reply to node E, which in turn may route the request to node F, and finally to point of presence 110C. Node D may therefore be assumed to route anycast requests to point of presence 110C. As node D services requests originating at the client computing devices 102B, this result may indicate undesirable anycast routing.

Figure 2:
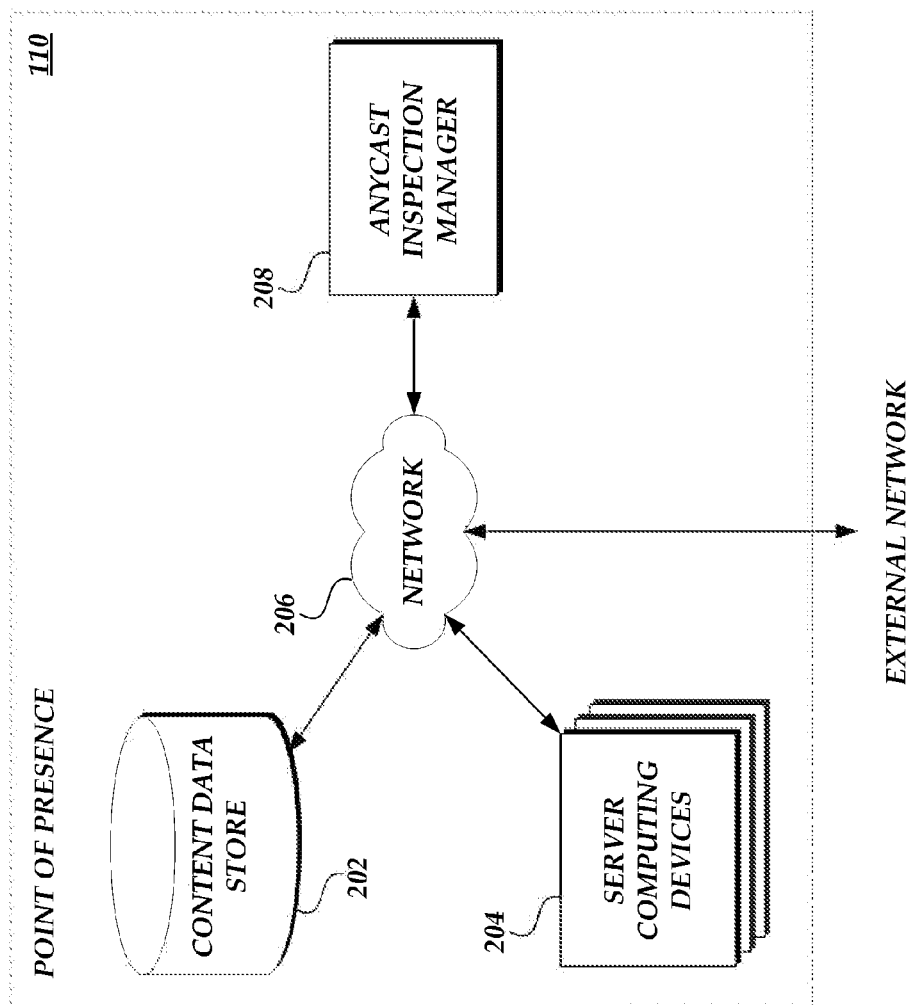
FIG. 2 is a block diagram depicting an illustrative point of presence included within the network topology of FIG. 1.

With reference to FIG. 2, one illustrative example of a point of presence 110 of FIG. 1 is depicted. In the illustrative example of FIG. 2, the point of presence 110 is depicted as a set of computing devices interconnected via an internal network 206 of the point of presence 110. Specifically, the point of presence 110 includes a content data store 202, one or more server computing devices 204 and an anycast inspection manager 208. The server computing devices 204 may be configured to provide services to the client computing devices 102 (not shown in FIG. 2). For example, the server computing devices 204 may provide DNS services to the client computing devices 102 based on data included within the content data store 202. As a further example, the server computing devices 204 may provide CDN services to client computing devices 202, by providing client computing devices 202 with access to the content in the content data store 202. In addition, the point of presence 110 includes an anycast inspection manager 208 configured to transmit anycast probes to client computing devices 102 and/or network nodes (not shown within FIG. 2), to record responses to anycast probes, and to analyze responses to detect undesirable anycast routing.

It will be appreciated by those skilled in the art that the point of presence 110 may have fewer or greater components than are illustrated in FIG. 2. In addition, the point of presence 110 could include various web services and/or peer-to-peer network configurations. Thus, the depiction of the point of presence 110 should be taken as illustrative and not limiting to the present disclosure. For example, in some embodiments, components of the point of presence 110, such as the anycast inspection manager, may be executed by one more virtual machines implemented in a hosted computing environment. A hosted computing environment may include one or more rapidly provisioned and released computing resources, which computing resources may include computing, networking and/or storage devices. A hosted computing environment may also be referred to as a cloud computing environment.

Any one or more of the anycast inspection manager 208, the content data store 202 and the server computing devices 204 may be embodied in a plurality of components, each executing an instance of the respective anycast inspection manager 208, content data store 202 and server computing devices 204. A server or other computing component implementing any one of the anycast inspection manager 208, the content data store 202 and the server computing devices 204 may include a network interface, memory, processing unit, and computer readable medium drive, all of which may communicate which each other may way of a communication bus. The network interface may provide connectivity over the network 206 and/or other networks or computer systems. The processing unit may communicate to and from memory containing program instructions that the processing unit executes in order to operate the respective anycast inspection manager 208, content data store 202 and server computing devices 204. The memory may generally include RAM, ROM, other persistent and auxiliary memory, and/or any non-transitory computer-readable media.

Each of the anycast inspection manager 208, content data store 202 and server computing devices 204 may be associated with one or more anycast networking addresses (e.g., IP addresses). In one embodiment, the point of presence 110 may be associated with an anycast address range (e.g., a specific subnetwork). For example, the point of presence may be associated with the 10.0.0.0/24 network address range (as expressed in Classless Inter-Domain Routing [CIDR] notation). Accordingly, the anycast inspection manager 208, the content data store 202 and the server computing devices 204 may individually be associated with addresses within the anycast network range of the point of presence 110. In general, requests for network addresses within a given anycast network range may be expected to be routed similarly across networks. Accordingly, replies to anycast probes addressed to a network address of the anycast inspection manager 208 can be expected to have similar routing to requests to access network addresses of server computing devices 204. In order to ensure transparent use of anycast addresses, the individual components or devices within different points of presence 110 may be assigned identical network addresses. For example, each anycast inspect manager 208 of the points of presence 110A through 110C of FIG. 1 may be assigned the illustrative anycast network address 10.0.0.254. Use of a dedicated network address for transmission and reception of anycast probes may reduce potential interference with the remaining devices or components within a point of presence 110.

Figure 3B:
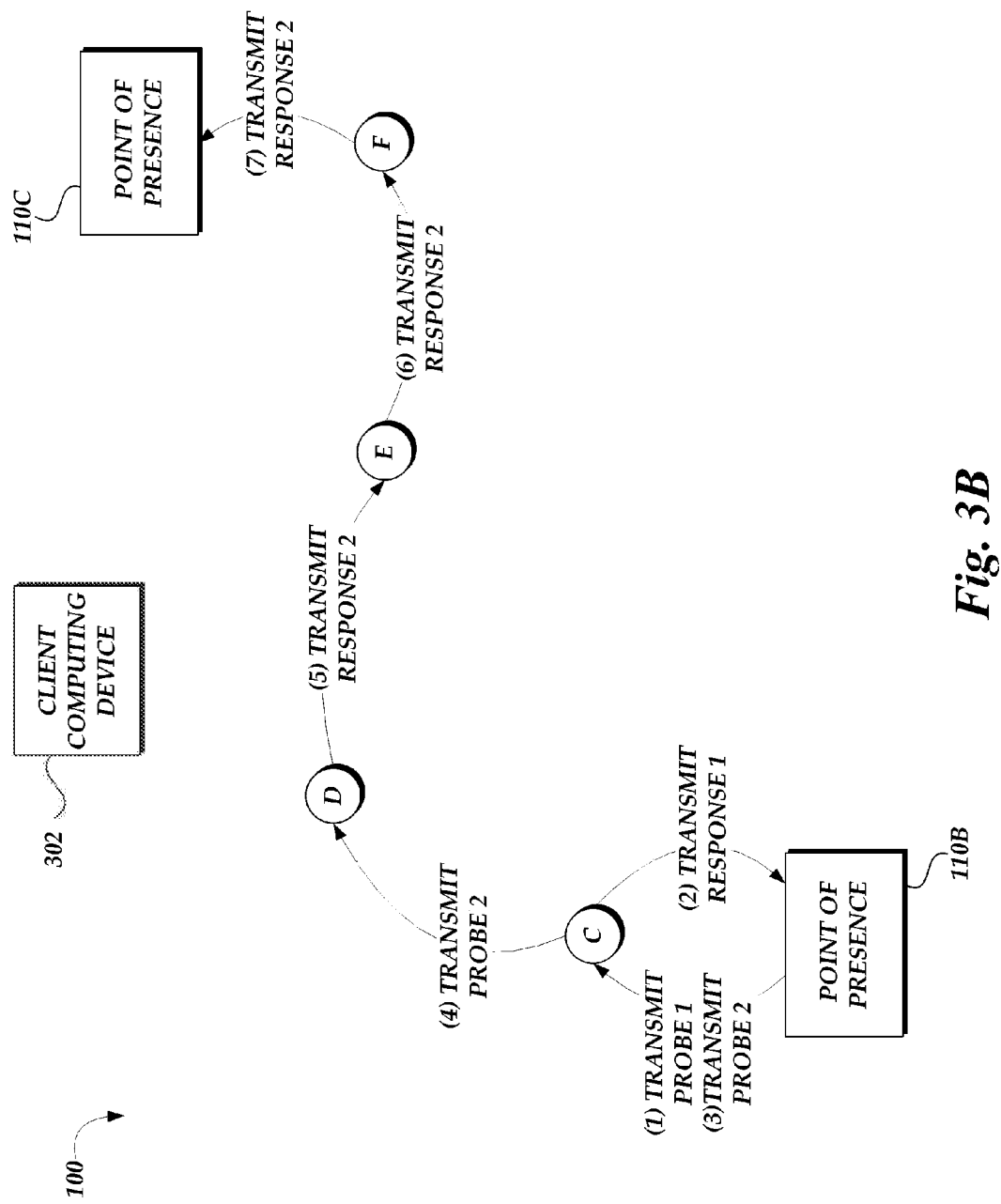
FIG. 3B is a block diagram illustrating transmission of anycast probes from a point of presence, and transmission of at least one probe response to an alternative point of presence.

With reference now to FIGS. 3A and 3B, illustrative interactions for transmission of anycast probes to network nodes will be described. Specifically, FIGS. 3A and 3B depict illustrative interactions for iteratively transmitting anycast probes to network nodes between an originating point of presence 110B and an individual client computing device 302 of the client computing devices 102B intended to be served by the point of presence 110B. As will be described below, the illustrative interactions of FIG. 3A represent interactions occurring under desirable anycast routing conditions, while the illustrative interactions of FIG. 3B represent interactions occurring under undesirable anycast routing conditions.

With reference to FIG. 3A, at (1), the point of presence 110B generates and transmits an anycast probe to a network node between an originating point of presence 110B and client computing devices 102B. Illustratively, the individual client computing device 302 of client computing devices 102B may be selected by the originating point of presence 110B based on an expected geographic location of the individual client computing device 302 (e.g., determined based on IP geolocation, account data of a user associated with the individual client computing device 302, etc.). In one embodiment, generation of an anycast probe includes generation of an ICMP echo request including a unique identifier of the point of presence 110B. The unique identifier may be any arbitrary identifier utilized by the points of presence 110 to identify a source of an anycast probe. For example, the unique identifier may be generated based on a media access control (MAC) address, such as by hashing the MAC address into a bit code to be inserted into an echo request.

In the interaction shown at (1), the originating point of presence 110B generates a first anycast probe targeted at an individual node along a network path to the target client computing device 302. In one embodiment, where the anycast probe corresponds to an echo request, the point of presence 110B can modify a TTL indicator within the request, such that a targeted node will return a time exceeded message. Accordingly, a TTL value of one can be expected to result in a time exceeded message from a first network node, a TTL value of two can be expected to result in a time exceeded message from a second network node, etc. Thereafter, the point of presence 110B transmits the first anycast probe targeted to the client computing device 302 via the network. While transmission of the first anycast probe is shown to network node C, in some embodiments, determination of a target for the first anycast probe may be made based on a destination address of the probe (e.g., an IP of the client computing device 302) and various routing protocols utilized by the point of presence 110B. Accordingly, network node C may not be specifically targeted for transmission of the first anycast probe.

After receiving the first anycast probe, the network node C generates a probe response and, at (3), transmits the response to the anycast IP address associated with the first anycast probe. Illustratively, assume that the first anycast probe is an echo request directed towards the client computing device 302 with a TTL of one. The network node C may be configured, in accordance with standardized protocols, to decrement the TTL of the echo request and, if the TTL exceeds zero, to forward the echo request towards the client computing device 302 (e.g., to a next network node selected in accordance with routing protocols of the network node C). In the illustrative example of FIG. 3A, because the TTL of anycast probe one reaches zero after decrementing, the network node C instead returns a time exceeded message. This time exceeded message includes the identifier within the anycast probe uniquely identifying point of presence 110B, as well as an IP address or other identifier of network node C. Further, the time exceeded message is directed towards the anycast address of the points of presence 110, and therefore may be routed to any of the points of presence 110 in accordance with routing of any intermediate nodes. In the illustrative example of FIG. 3A, the routing protocols of network node C determine that the response message should be directed to point of presence 110B, and therefore, the first response is returned to point of presence 110B. By receipt of the response, point of presence 110B can therefore conclude that network node C is likely to route other requests directed to the anycast address to point of presence 110B.

With continued reference to FIG. 3A at (3), the point of presence 110B generates and transmits a second anycast probe targeted at an individual node along a network path to the target client computing device 302. As discussed above, rather than targeting an identified node, the point of presence 110B may modify a TTL value of the probe in order to provoke a response message from a node a specified network distance from the point of presence 110B. For example, the point of presence 110B may generate an echo request with a TTL value of two, in order to provoke a timeout exceeded message from a network node two network hops distance from the point of presence 110B. The point of presence 110B then transmits the probe towards the targeted client computing device 302. Specifically, in accordance with rousing protocols of the point of presence 110B, the second probe is transmitted to network node C.

Thereafter, at (4), the network node C receives the second anycast probe and retransmits the probe towards the client computing device 302 in accordance with the node C's routing protocols. In the illustrative example of FIG. 3A, the network node C therefore transmits the probe to network node D. In the instance that the second anycast probe is an echo request including a TTL value, the network node C decrements the TTL value prior to transmission. Accordingly, the second anycast probe may include a TTL value of one prior to transmission to network node D.

On reception of the second anycast probe, the network node D generates a response message and, at (5), transmits the response message towards the anycast address associated with the point of presence 110B. Illustratively, the response message may be generated by the network node D in response to decrementing a TTL of the second probe to zero. In the illustrative interaction of FIG. 3A, the internal routing metrics utilized by network node D determine that a response destined for the anycast address of point of presences 110 should be routed to network node C. Accordingly, at (6), network node C receives and retransmits the response to point of presence 110B (in accordance with network node C's own routing protocols). The point of presence 110B therefore receives the response message, indicating that transmissions from the network node D destined for the anycast address of the points of presence 110 are likely to be routed to the point of presence 110B.

In accordance with iterative transmission of anycast nodes, at (7), the point of presence 110B generates a third anycast probe and transmits the probe towards the targeted client computing device 302. Similarly to the first and second anycast probes discussed above, at (8) and (9), the third anycast probe is routed according to protocols of the point of presence 110B and intermediate nodes C and D to the client computing device 302. Illustratively, the third probe may be associated with a TTL value of three. However, because only two networking nodes exist between the point of presence 110B and the targeted client computing device 302, no time exceeded message is generated by nodes A or B. Accordingly, the probe reaches the client computing device 302, which in response, generates a third response. The third response identifies the address of the client computing device 302, includes the identifier of the third probe (e.g., of the point of presence 110B), and is targeted towards the anycast address of the points of presence 110. In one embodiment, the reply message is an ICMP echo reply (e.g., a "pong"). At (10), the client computing device 302 transmits the third response towards the anycast address of the points of presence 110. Specifically, the routing protocols of client computing device 302 direct the response to networking node D. In turn, at (11) and (12), the networking nodes D and C, respectively, transmit the response to the point of presence 110B. The point of presence 110B therefore receives the response, indicating that transmissions from the client computing device 302 destined for the anycast address of the points of presence 110 are likely to be routed to the point of presence 110B. The point of presence 110B can therefore determine that the routing of anycast requests from the client computing device 302 complies with a desired routing path.

With reference to FIG. 3B, an alternative to the interactions of FIG. 3A will be described. Specifically, the illustrative interactions of FIG. 3B represent interactions occurring as a result of an undesirable anycast routing path. Interactions (1) through (4) may generally mirror corresponding interactions described above with respect to FIG. 3A. Specifically, the point of presence 110B generates successive anycast probes directed towards the client computing device 302, and receives responses from intermediate nodes. These interactions are detailed above and are therefore not repeated with respect to FIG. 3B.

However, in the interactions of FIG. 3B, at (5), network node D generates and transmits a probe response to network node E. The response generated by network node D within FIG. 3B may be identical to the response generated by network node D within FIG. 3A. However, the internal routing protocols of network node D may determine that responses directed towards the anycast address of the points of presence 110 should be routed to network node E (as opposed to network node C, in accordance with the description of FIG. 3A). Illustratively, network node D may determine routing of the response based on network routing metrics that favor node E over node C when routing requests directed towards the anycast address of points of presence 110. These routing metrics may not be configurable by an operator of the points of presence 110, and therefore anycast requests originating from the network node C may take an undesirable routing path. Specifically, at (6) and (7), networking nodes E and F respectively may transmit the response to point of presence 110C. Point of presence 110C, in turn, may view a source address of the message (e.g., an address of network node D), an original destination of the message (e.g., client computing device 302), as well as the identifier within the response identifying point of presence 110B as the originating point of presence 110. Accordingly, point of presence 110C can determine that anycast requests transmitted from either the client computing device 302 or the networking node D are likely to be routed to point of presence 110C. Because client computing device 302 is intended to be served by point of presence 110B, this result may be indicative of undesirable anycast routing by network node D.

One skilled in the art will appreciate that additional or alternative interactions may occur within the scope of FIGS. 3A and 3B. For example, the interactions of FIG. 3B may include generation and transmission of additional iterative probes (e.g., to client computing device 302), as well as responses to such probes. Further, while a limited number of interactions are described with respect to FIGS. 3A and 3B due to the simplified nature of network topology 100, one skilled in the art will appreciate that any number of networking nodes may separate a point of presence 110 and a targeted client computing device. Iterative transmission of anycast probes may therefore include transmission of a larger number of probes than discussed with respect to FIGS. 3A and 3B. Accordingly, the interactions of FIGS. 3A and 3B are intended to be illustrative in nature.

Figure 4:
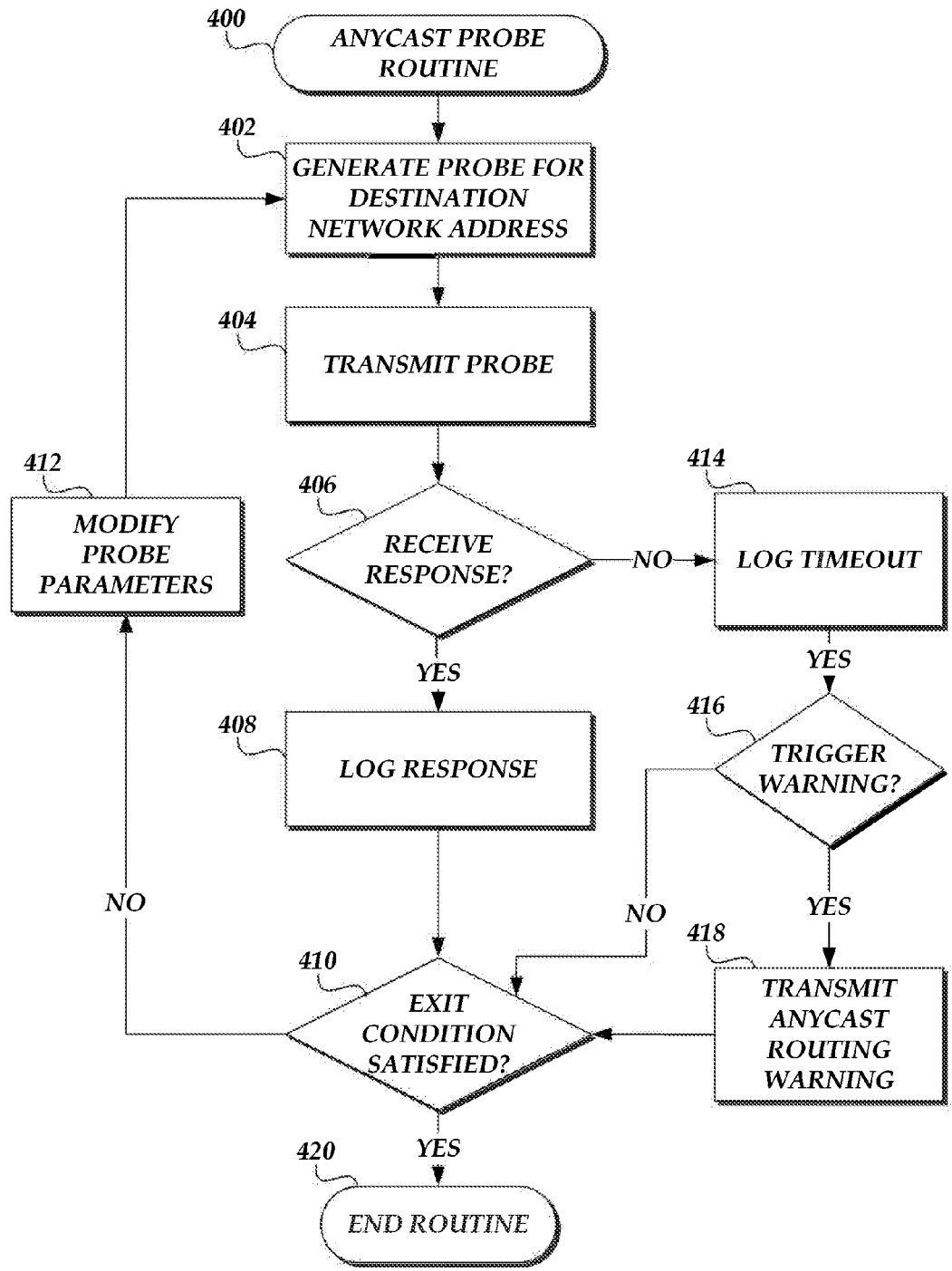
FIG. 4 is a flow-diagram of an anycast probing routine implemented by a point of presence to identify anycast routing and detect undesirable anycast routings.

With reference to FIG. 4, one illustrative routine 400 to iteratively transmit anycast probes will be described. The routine 400 may be implemented, for example, by an anycast inspection manager 208 within a point of presence 110 of FIG. 2. As will be described below, the routine 400 enables an anycast inspection manager 208 to transmit anycast probes to client computing devices 102 and/or network devices existing on route to client computing devices 102, and to map anycast routing of those devices based on received responses. Further, the routine 400 enables an anycast inspection manager 208 to automatically detect undesirable routing of anycast requests based on received responses, or to store data regarding received responses for further manual analysis (e.g., by an operator of the point of presence 110).

The routine 400 begins at block 402, where an anycast probe is generated for a destination network address. Illustratively, a destination network address may be an IP address of a client computing device 102 selected based on a desired service area of a point of presence 110. For example, where a desired service area corresponds to a geographical area, a destination network address may be an address of a client computing device 102 expected to be located within the geographical area (e.g., determined based on IP geolocation, etc.). While the routine 400 is described with respect to a destination network address, in some instances the routine 400 may be implemented multiple times, either successively or concurrently, for various destination network addresses. Multiple iterations of routine 400 may result in more robust data by minimizing errors that may occur (e.g., due to devices at or on the path to a destination network address being offline or configured not to respond to anycast probes).

As described above, generation of an anycast probe may include generation of an ICMP echo request including a unique identifier of the point of presence 110 from which the probe will be transmitted. Further, a generated echo request may include a TTL value selected in order to target a device along a network path from the point of presence 110 to the destination network address. For example, on beginning execution of routine 400, a generated echo request with a TTL value of one may be generated to target a first networking device on the network path from the point of presence 110 to the destination network address.

Subsequently, at block 404, the generated probe is transmitted to the destination address. One skilled in the art will appreciate that transmission of the probe to a destination address includes transmission of the probe between one or more network devices selected based on routing protocols and metrics of each network device. Illustratively, transmission of a probe to a destination address may be analogized to transmission of the probe to a first network device, with a request that the probe be subsequently transmitted towards the destination address.

At block 406, the point of presence 110 determines whether a response has been received by the probe. In one embodiment, the point of presence 110 may wait for a predetermined period of time to receive a response before determining that no response has been received. If a response is received, the routine continues at block 408, where the response is logged (e.g., for further reference or analysis). As described above, a number of different response types may be received after transmission of an anycast probe. For example, where a TTL value of the probe does not exceed the number of intermediate nodes in the path between the point of presence 110 and a destination network address, a response may correspond to a time exceeded message. Conversely, where a TTL value of the probe exceeds the number of intermediate nodes in the path between the point of presence 110 and a destination network address, a response may correspond to an echo response message. In both instances, a received response generally includes a source address of the device from which the response was transmitted, as well as the identifier placed within the probe by the point of presence. Accordingly, by viewing multiple responses along a single network path in succession, a large amount of detail related to anycast routing along the network path may be obtained. For example, a specific network device at which anycast routing diverges from a desirable path can be identified. In order to facilitate such identification, the received response and/or information regarding the response can be stored at block 408.

In the instance that a response is not received at block 406, the routine 400 continues at block 414, where a timeout of the probe is logged. Reception of a response can be dependent on a number of factors, including configuration of the device to which the probe was transmitted. However, lack of a response may also indicate that anycast requests transmitted from the destination address will not be routed to the point of presence 110 implementing the routine 400. Specifically, because responses are generally transmitted to the anycast network address of the point of presence 110, such responses may be received by any alternative point of presence 110 associated with the anycast address. Accordingly, a timeout of a probe may be indicative of undesirable anycast routing between the point of presence and a destination network address.

At block 416, the point of presence 110 determines whether, based on timeout of the previously transmitted probe, to trigger a warning to an operator of the point of presence 110 regarding a potentially undesirable anycast routing. In one embodiment, warnings may be triggered based on detecting a threshold number of timeouts (e.g., 3 consecutive timeouts). Such a threshold may be established, for example, in order to reduce false warnings of undesirable anycast routes (e.g., due to timeouts based on unavailability or configuration of receiving devices). However, if a threshold number of consecutive timeouts is received, the point of presence 110 may determine that anycast requests transmitted from the destination address are not being routed to the point of presence, and therefore trigger a warning. In another embodiment, a warning may be triggered based at least in part on a distance from the point of presence 110 at which a timeout occurred. For example, a point of presence 110 may be associated with a minimum desired hop-count value, such that the point of presence 110 is intended to service devices reachable within the minimum desired hop-count value. Accordingly, where a timeout occurs from a device at a distance greater than the minimum desired hop-count value (e.g., as determined by a TTL value of the anycast probe), the point of presence 110 may determine not to transmit a warning. Conversely, where a timeout (or a number of successive timeouts) occurs at a distance equal to or less than the minimum desired hop-count value, the point of presence 110 may determine that a warning should be transmitted.

In the instance that a warning is transmitted, the routine 400 continues at block 418, where a warning is transmitted to an operator of the point of presence 110. In one embodiment, transmission of a warning includes transmission of an electronic message (e.g., an email, short message service [SMS] message, or other electronic notification). In another embodiment, transmission of a warning includes logging of the warning within a data store (e.g., within a log associated with the point of presence 110). Illustratively, on reception of the warning, an operator of the point of presence 110 may further inspect the anycast probe logs and take actions necessary to correct undesirable routing (if necessary).

Subsequent to either block 408, block 416, or block 418, the routine 400 continues at block 410, where the point of presence 110 determines if an exit condition of the routine 400 has been satisfied. Exit conditions may be selected according to a number of criteria in order to ensure that the routine 400 gathers sufficient amounts of data regarding anycast routing. In one embodiment, an exit condition may specify a maximum number of probes to be transmitted by the point of presence or a maximum network distance that a probe should be transmitted (e.g., as specified in a TTL of the probe). In another embodiment, an exit condition may specify that routine 400 should terminate if a response is received from the destination network address itself (e.g., as opposed to an intermediate network node). In yet another embodiment, an exit condition may specify that the routine 400 should terminate after transmission of an anycast routing warning.

If the point of presence 110 determines that exit conditions are not satisfied, the routine 400 continues to block 412, where the parameters of a generated anycast probe are modified. Illustratively, modification of anycast probe parameters can include incrementing a TTL value of the probe, such that a response is elicited from an incremental networking device along the path to the destination network address. Subsequent to modification of probe parameters, the routine 400 continues at block 402. Accordingly, by repeated execution of blocks 402 through 418, a sufficiently large set of data related to anycast routing may be gathered by the point of presence 110. In the instance that execution of the routine 400 results in satisfaction of exit conditions at block 410, the routine terminates at block 420.

One skilled in the art will appreciate that the routine 400 may include many additional or alternative interactions, and that the routine 400 may be implemented by a single point of presence 110, or by multiple points of presence 110 in conjunction. In one embodiment, transmission of anycast probes and reception of responses to those probes may be implemented independently. For example, a single point of presence 110 may implement a modified routine 400 to transmit anycast probes, response to which may be received at a number of points of presence 110. Each such receiving point of presence 110 may implement a modified routine 400 to log responses to such probes. Accordingly, the interactions of routine 400 are intended to be illustrative in nature, and not limiting.

All of the methods and processes described above may be embodied in, and fully automated via, software code modules executed by one or more general purpose computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
a first computing device associated with an anycast network address and configured to:
select a destination network address for anycast inspection;
transmit a set of echo requests to a plurality of network devices within a communication path between the first computing device and the destination network address, each of the set of echo requests transmitted to an individual network device of the plurality of network devices;
receive a set of responses to the echo requests, wherein each of the set of responses is received from an individual network device of the plurality of network devices; and
for each response of the set of responses, record an association between the first computing device and requests transmitted by the individual network device from which the response was received for delivery to the anycast network address; and
a second computing device associated with the anycast network address, the second computing device configured to:
receive a second set of responses to the echo requests, wherein each of the set of responses is received from an individual network device of the plurality of network devices; and
for each response of the second set of responses, record an association between the second computing device and requests transmitted by the individual network device from which the response was received for delivery to the anycast network address.

2. The system of claim 1, wherein the first computing device is associated with a network-accessible service provided to a computing device associated with the destination network address.

3. The system of claim 2, wherein the network-accessible service is at least one of a domain name service or a content distribution service.

4. The system of claim 1, wherein destination network address is selected based at least in part on a geographical location associated with the destination network address.

5. The system of claim 1, wherein the echo requests are ICMP echo requests.

6. A method comprising:
selecting, at a first point of presence of a plurality of points of presence associated with an anycast network address, a destination network address for anycast inspection;
transmitting a set of echo requests to a plurality of network devices within a communication path between the first point of presence and the destination network address, each of the set of echo requests transmitted to an individual network device of the plurality of network devices;
receiving a set of responses to the echo requests at the first point of presence, wherein each of the set of responses is received from an individual network device of the plurality of network devices; and
for each response of the set of responses, recording routing path information indicating that anycast requests, transmitted by the individual network device from which the response was received for delivery to the anycast network address, have been routed to the first point of presence of the plurality of points of presence.

7. The method of claim 6, wherein transmitting the set of echo requests to the plurality of network devices within a communication path between the first point of presence and the destination network address comprises transmitting the set of echo requests along the communication path for delivery to the destination network address.

8. The method of claim 7, wherein transmitting the set of echo requests to the plurality of network devices within a communication path between the first point of presence and the destination network address further comprises modifying a time to live value of each of the set of echo requests to target individual network devices within the plurality of network devices.

9. The method of claim 6 further comprising:
receiving a second set of responses to the echo requests at a second point of presence of a plurality of points of presence associated with the anycast network address, wherein each of the set of responses is received from an individual network device of the plurality of network devices; and
for each response of the set of responses, recording routing path information indicating that anycast requests transmitted for delivery to the anycast network address by the individual network device from which the response was received, have been routed to the second point of presence of the plurality of points of presence.

10. The method of claim 6 further comprising:
determining that the set of responses does not meet a threshold number of responses; and
transmitting a message to an operator of the first computing device regarding potential undesirable anycast routing to the destination network address.

11. A non-transitory computer readable storage medium including computer-executable instructions comprising:
first computer executable instructions that, when executed by a first point of presence computing device, of a plurality of point of presence computing devices associated with an anycast network address, cause the first point of presence computing device to:
select a destination network for anycast inspection; and
transmit a set of echo requests to a plurality of network devices within a communication path between the first point of presence computing device and the destination network address, each of the set of echo requests transmitted to an individual network device of the plurality of network devices;
second computer-executable instructions that, when executed by the first point of presence computing device, cause the first point of presence computing device to:
receive a set of responses to the echo requests at the first point of presence computing device, wherein each of the set of responses is received from an individual network device of the plurality of network devices; and
for each response of the set of responses, record routing path information indicating that anycast requests transmitted by the individual network device from which the response was received to the anycast network address for delivery to the anycast network address, have been routed to the first point of presence computing device.

12. The non-transitory computer readable storage medium of claim 11, wherein the computer-executable instructions include third computer-executable instructions that, when executed by the first point of presence computing device, cause the first point of presence computing device to:
determine that a maximum network distance associated with the set of responses does not meet a threshold network distance; and
transmit a message to an operator regarding potential undesirable anycast routing to the destination network address.

13. The non-transitory computer readable storage medium of claim 11, wherein the destination network address is selected based on a desired association between the first point of presence computing device and the destination network address.

14. The non-transitory computer readable storage medium of claim 11, wherein the desired association is determined based at least in part on an expected geographical location of a computing device utilizing the destination network address.

15. The non-transitory computer readable storage medium of claim 11, wherein the computer-executable instructions include third computer-executable instructions that, when executed by a second point of presence computing device, of the plurality of point of presence computing devices associated with the anycast network address, cause the second point of presence computing device to:
receive a second set of responses to the echo requests at the second point of presence computing device, wherein each of the set of responses is received from an individual network device of the plurality of network devices; and
for each response of the set of responses, record routing path information indicating that anycast requests transmitted by the individual network device from which the response was received for delivery to the anycast network address, have been routed to the second point of presence computing device.

16. The non-transitory computer readable storage medium of claim 11, wherein each of the set of echo requests is associated with a monotonically increasing time to live value.

17. The non-transitory computer readable storage medium of claim 11, wherein each of the set of echo requests includes a unique identifier of the first point of presence computing device.

18. A system comprising:
a first computing device, of a plurality of computing devices associated with an anycast network address configured to:
  transmit a set of echo requests to a plurality of network devices within a communication path between the first computing device and a destination network address, each of the set of echo requests transmitted to an individual network device of the plurality of network devices;
  receive a set of responses to the echo requests, wherein each of the set of responses is received from an individual network device of the plurality of network devices; and
  for each response of the set of responses, record routing path information indicating that anycast requests, transmitted by the individual network device from which the response was received for delivery to the anycast network address, have been routed to the first computing device.

19. The system of claim 18, wherein each of the set of echo requests is associated with a monotonically increasing time to live value.

20. The system of claim 18, wherein each of the set of echo requests includes a unique identifier of the first computing device.

21. The system of claim 18, wherein each of the set of responses includes the unique identifier.

22. The system of claim 18, wherein each of the set of responses includes a network address of an individual network device from which the response was received.

23. The system of claim 18, wherein the set of responses includes at least one time exceeded response.

* * * * *